US008380201B2

(12) United States Patent
Takahashi et al.

(10) Patent No.: US 8,380,201 B2
(45) Date of Patent: Feb. 19, 2013

(54) MOBILE COMMUNICATION METHOD AND RADIO BASE STATION

(75) Inventors: Hideaki Takahashi, Yokohama (JP); Wuri Andarmawanti Hapsari, Yokosuka (JP); Takeshi Okamoto, Yokusuka (JP); Mikio Iwamura, Tokyo (JP); Minami Ishii, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 0 days.

(21) Appl. No.: 13/502,000

(22) PCT Filed: Oct. 14, 2010

(86) PCT No.: PCT/JP2010/068009
§ 371 (c)(1),
(2), (4) Date: Jun. 27, 2012

(87) PCT Pub. No.: WO2011/046159
PCT Pub. Date: Apr. 21, 2011

(65) Prior Publication Data
US 2012/0258768 A1     Oct. 11, 2012

(30) Foreign Application Priority Data

Oct. 14, 2009   (JP) .................................. 2009-237780

(51) Int. Cl.
*H04W 36/00* (2009.01)
*H04W 4/00* (2009.01)
(52) U.S. Cl. ........ 455/436; 455/437; 455/438; 455/439; 455/440; 455/441; 455/442; 455/443; 455/444; 370/331; 370/332; 370/333; 370/334
(58) Field of Classification Search .......... 455/436–444; 370/331–334
See application file for complete search history.

(56) References Cited

U.S. PATENT DOCUMENTS

| 2010/0142407 A1* | 6/2010 | Serravalle ..................... 370/254 |
| 2010/0173626 A1* | 7/2010 | Catovic et al. ................ 455/423 |
| 2010/0173633 A1* | 7/2010 | Catovic et al. ................ 455/436 |

(Continued)

FOREIGN PATENT DOCUMENTS

| JP | 20090124671 A | 6/2009 |
| WO | 2009/099170 A1 | 8/2009 |

OTHER PUBLICATIONS

Catt, "Reporting of Access Mode," 3GPP TSG RAN WG2 Meeting #67, R2-094311, Shenzhen, China, Aug. 24-28, 2009, 2 pages.

(Continued)

*Primary Examiner* — Nathan Mitchell
(74) *Attorney, Agent, or Firm* — Osha Liang LLP

(57) ABSTRACT

A radio base station managing a handover source cell decides a method for achieving a handover in consideration of CSG-ID and Access Mode of a handover destination cell. A mobile communication method comprises: a step of notifying, by a radio base station HeNB#1, a radio base station HeNB#2 of CSG-ID and Access Mode of cell subordinate to a radio base station HeNB#1, when establishing an X2 connection with the radio base stations HeNB#2; the radio base station HeNB#2 managing the CSG-ID and the Access Mode of the cell subordinate to the radio base station HeNB#1; a step of deciding the method for performing the handover of the mobile station UE from the cell subordinate to the radio base station HeNB#2 to the cell subordinate to the radio base station HeNB#1 on the basis of the managed CSG-ID and Access Mode of the cell subordinate to the radio base station HeNB#1.

4 Claims, 12 Drawing Sheets

U.S. PATENT DOCUMENTS

| | | | | |
|---|---|---|---|---|
| 2010/0173665 | A1* | 7/2010 | Michel et al. | 455/522 |
| 2010/0238901 | A1* | 9/2010 | Sampath et al. | 370/331 |
| 2010/0323662 | A1* | 12/2010 | Dahlen et al. | 455/410 |
| 2011/0013593 | A1 | 1/2011 | Hapsari et al. | |
| 2012/0040678 | A1* | 2/2012 | Matsunami et al. | 455/436 |
| 2012/0106488 | A1* | 5/2012 | Nylander et al. | 370/329 |
| 2012/0120915 | A1* | 5/2012 | Wang et al. | 370/331 |
| 2012/0122422 | A1* | 5/2012 | Olsson et al. | 455/410 |
| 2012/0177007 | A1* | 7/2012 | Kagimoto et al. | 370/331 |

OTHER PUBLICATIONS

3GPP TS 36.300 V9.3.0, Mar. 2010, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), 166 pages.

3GPP TR R3.020 V0.9.0, Sep. 2008, 3rd Generation Partnership Project; Technical Specification Group Radio Access Network; Home (e)NodeB; Network aspects (Release 8), 67 pages.

3GPP TS 36.423 V9.3.0, Jun. 2010, 3rd Generation Partnership Project; Technical Specification Group Radio Access Network; Evolved Universal Terrestrial Radio Access Network (E-UTRAN); X2 application protocol (X2AP) (Release 9), 121 pages.

Japanese Office Action issued in corresponding Japanese Application No. 2009-237780, mailed on Jul. 19, 2011, with translation, 6 pages.

International Search Report issued in PCT/JP2010/068009, mailed on Dec. 28, 2010, with translation, 2 pages.

\* cited by examiner

FIG. 6

IE WITHIN X2 SETUP REQUEST MESSAGE

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| MESSAGE TYPE | M | | 9.2.13 | | YES | REJECT |
| GLOBAL eNB ID | M | | 9.2.22 | | YES | REJECT |
| SERVED CELLS | | 1 to maxCellineNB | | THIS IS ALL THE eNB CELLS | YES | REJECT |
| >SERVED CELL INFORMATION (NOTIFY CSG ID) | M | | 9.2.8 | | — | — |
| >NEIGHBOUR INFORMATION | | 0 to maxnoofNeighbours | | | | |
| >>ECGI | M | | ECGI 9.2.14 | E-UTRAN CELL GLOBAL IDENTIFIER OF THE NEIGHBOUR CELL | — | — |
| >>PCI | M | | INTEGER (0..503,...) | PHYSICAL CELL IDENTIFIER OF THE NEIGHBOUR CELL | — | — |
| >>EARFCN | M | | 9.2.26 | DL EARFCN FOR FDD AND EARFCN FOR TDD | — | — |
| >>CSG ID | M | | | | — | — |
| >>CELL ACCESS MODE | M | | ENUMERATED (CLOSED, HYBRID, OPEN) | | — | — |
| GU GROUP ID LIST | | 0 to maxIfPools | | THIS IS ALL THE POOLS TO WHICH THE eNB BELONGS TO | GLOBAL | REJECT |
| >GU GROUP ID | M | | 9.2.20 | | — | — |

FIG. 7

IE WITHIN SERVED CELL INFORMATION

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| PCI | M | | INTEGER (0..503,...) | PHYSICAL CELL ID | – | – |
| CELL ID | M | | ECGI 9.2.14 | | – | – |
| TAC | M | | OCTET STRING(2) | TRACKING AREA CODE | – | – |
| CSG ID | M | | ENUMERATED (CLOSED, HYBRID, OPEN) | | | |
| CELL ACCESS MODE | M | | | | – | – |
| BROADCAST PLMNS | | 1..<maxnoofBPLMNs> | | BROADCAST PLMNS | – | – |
| >PLM IDENTITY | M | | 9.2.4 | | – | – |
| CHOICE EUTRA-MODE-INFO | M | | | | – | – |
| >FDD | | | | | | |
| >>FDD INFO | | 1 | | | | |
| ABBR. | | | | | | |
| >TDD | | | | | | |
| >>FDD INFO | | 1 | | | – | – |
| ABBR. | | | | | | |
| NUMBER OF ANTENNA PORTS | O | | 9.2.43 | | YES | IGNORE |

FIG. 8

IE WITHIN X2 SETUP RESPONSE MESSAGE

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| MESSAGE TYPE | M | | 9.2.13 | | YES | REJECT |
| GLOBAL eNB ID | M | | 9.2.22 | | YES | REJECT |
| SERVED CELLS | | 1 to maxCellineNB | | THIS IS ALL THE eNB CELLS | YES | REJECT |
| >SERVED CELL INFORMATION (NOTIFY CSG ID) | M | | 9.2.8 | | – | – |
| >NEIGHBOUR INFORMATION | | 0 to maxnoofNeighbours | | | | |
| >>ECGI | M | | ECGI 9.2.14 | E-UTRAN CELL GLOBAL IDENTIFIER OF THE NEIGHBOUR CELL | – | – |
| >>PCI | M | | INTEGER (0..503,...) | PHYSICAL CELL IDENTIFIER OF THE NEIGHBOUR CELL | – | – |
| >>EARFCN | M | | 9.2.26 | DL EARFCN FOR FDD AND EARFCN FOR TDD | – | – |
| >>CSG ID | M | | | | – | – |
| >>CELL ACCESS MODE | M | | ENUMERATED (CLOSED, HYBRID, OPEN) | | | |
| GU GROUP ID LIST | | 0 to maxPools | | THIS IS ALL THE POOLS TO WHICH THE eNB BELONGS TO | GLOBAL | REJECT |
| >GU GROUP ID | M | | 9.2.20 | | – | – |
| CRITICALITY DIAGNOSTICS | O | | 9.2.7 | | YES | IGNORE |

FIG. 11

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| MESSAGE TYPE | M | | 9.2.13 | | YES | REJECT |
| SERVED CELLS TO ADD | | 0 to maxCellineNB | | | GLOBAL | REJECT |
| >SERVED CELL INFORMATION (NOTIFY CSG ID) | M | | 9.2.8 | | — | — |
| >NEIGHBOUR INFORMATION | | 0 to maxnoofNeighbours | | | — | — |
| >>ECGI | M | | ECGI 9.2.14 | E-UTRAN CELL GLOBAL IDENTIFIER OF THE NEIGHBOUR CELL | — | — |
| >>PCI | M | | INTEGER (0..503,...) | PHYSICAL CELL IDENTIFIER OF THE NEIGHBOUR CELL | — | — |
| >>EARFCN | M | | 9.2.26 | DL EARFCN FOR FDD AND EARFCN FOR TDD | — | — |
| >>CSG ID | M | | | | — | — |
| >>CELL ACCESS MODE | M | | ENUMERATED (CLOSED, HYBRID, OPEN) | | — | — |
| SERVED CELLS TO MODIFY | | 0 to maxCellineNB | | | GLOBAL | REJECT |
| >OLD ECGI | M | | ECGI 9.2.14 | THIS IS THE OLD E-UTRAN CELL GLOBAL IDENTIFIER | — | — |
| >SERVED CELL INFORMATION (NOTIFY CSG ID) | M | | 9.2.8 | | — | — |
| >NEIGHBOUR INFORMATION | | 0 to maxnoofNeighbours | | | — | — |
| >>ECGI | M | | ECGI 9.2.14 | E-UTRAN CELL GLOBAL IDENTIFIER OF THE NEIGHBOUR CELL | — | — |
| >>PCI | M | | INTEGER (0..503,...) | PHYSICAL CELL IDENTIFIER OF THE NEIGHBOUR CELL | — | — |
| >>EARFCN | M | | 9.2.26 | DL EARFCN FOR FDD AND EARFCN FOR TDD | — | — |
| >>CSG ID | M | | | | — | — |
| >>CELL ACCESS MODE | M | | ENUMERATED (CLOSED, HYBRID, OPEN) | | — | — |
| SERVED CELLS TO DELETE | | 0 to maxCellineNB | | | GLOBAL | REJECT |
| >OLD ECGI | M | | ECGI 9.2.14 | THIS IS THE OLD E-UTRAN CELL GLOBAL IDENTIFIER OF THE CELL TO BE DELETED | — | — |
| GU GROUP ID TO ADD LIST | | 0 to maxPools | | | GLOBAL | REJECT |
| >GU GROUP ID | M | | 9.2.20 | | — | — |
| GU GROUP ID TO DELETE LIST | | 0 to maxPools | | | GLOBAL | REJECT |
| >GU GROUP ID | M | | 9.2.20 | | — | — |

MOBILE COMMUNICATION METHOD AND RADIO BASE STATION

TECHNICAL FIELD

The present invention relates to a mobile communication method and to a radio base station.

BACKGROUND ART

In a mobile communication system of an LTE (Long Term Evolution) scheme, it is defined only that a radio base station HeNB#1 or HeNB#3 which manages handover source cells performs only an S1 handover as a method for achieving a handover of a mobile station UE.

However, even in this case, an X2 handover may be performed under the conditions that the X2 handover can be performed.

For example, the X2 handover can be performed between cells operated in "Closed Mode" operated where a connection of only a mobile station of a particular subscriber is allowed by an owner of the radio base station HeNB, and between the cells subordinate to radio base stations HeNB with the same "Closed Subscriber Group ID (CSG-ID)" which are the identifiers to designate the particular subscriber.

Alternately, the X2 handover can be performed between the cells subordinate to radio base stations HeNB operated in "Open Mode" where connectable mobile stations are not limited.

Furthermore, the X2 handover can be performed between cells subordinate to radio base stations HeNB operated in "Hybrid Mode", where the "Closed Mode" and the "Open Mode" are simultaneously operated, which is Access Mode where priority control operations different between the mobile stations belonging to a specific CSG and the mobile stations not belonging to the specific CSG are performed, between the cells subordinate to the radio base stations with the same CSG operated in the "Closed Mode", or between the cells subordinate to the radio base stations HeNB operated in the "Open Mode".

The mobile communication system of the existing LTE scheme, however, has a problem in that each radio base station HeNB does not manage Access Mode and CSG-ID (Closed Subscriber Group) of the cell subordinate to a neighboring radio base station HeNB, and therefore, as illustrated in FIG. 12, the radio base station HeNB#1 or HeNB#3 cannot consider Access Mode and CSG-ID of the cell subordinate to the radio base station HeNB#2 at the time of deciding the method (the X2 handover or the S1 handover) for achieving the handover of the mobile station UE from the cell subordinate to the radio base station HeNB#1 or HeNB#3 to the cell subordinate to the radio base station HeNB#2.

SUMMARY OF THE INVENTION

Therefore, the present invention has been achieved in view of the above-described problem, and an object thereof is to provide a mobile communication method and a radio base station, by which it is possible for a radio base station that manages a handover source cell to decide a method for achieving a handover with consideration of Access Mode and CSG-ID of a handover destination cell.

A first characteristic of the present embodiment is summarized in that a mobile communication method, comprising, a step of a first radio base station notifying, when establishing a connection with a second radio base station, the second radio base station of registered-group identification information and an access mode of a cell subordinate to the first radio base station a step of managing, by the second radio base station, the notified registered-group identification information and access mode of the cell subordinate to the first radio base station, and a step of deciding, by the second radio base station, a method for performing a handover of the mobile station from the cell subordinate to the second radio base station to the cell subordinate to the first radio base station on the basis of the managed registered-group identification information and access mode of the cell subordinate to the first radio base station.

A second characteristic of the present embodiment is summarized in that a mobile communication method, comprising, a step of transmitting, by the first radio base station, when at least one of the registered-group identification information and the access mode of the cell subordinate to the first radio base station is changed, a configuration change signal containing at least one of the changed registered-group identification information and access mode of the cell subordinate to the first radio base station, to the second radio base station, a step of managing, by the second radio base station, the registered-group identification information and the access mode of the cell subordinate to the first radio base station contained in the received configuration change signal, and a step of deciding, by the second radio base station, a method for performing a handover of the mobile station from the cell subordinate to the second radio base station to the cell subordinate to the first radio base station on the basis of the latest managed registered-group identification information and access mode of the cell subordinate to the first radio base station.

A third characteristic of the present embodiment is summarized in that a radio base station, comprising, an acquisition unit configured to acquire, when establishing a connection with a neighboring radio base station, registered-group identification information and an access mode of a cell subordinate to the neighboring radio base station, from the neighboring radio base station, a management unit configured to manage the registered-group identification information and the access mode, acquired by the acquisition unit, of the cell subordinate to the neighboring radio base station, and a handover processing unit configured to decide a method for performing a handover of a mobile station from the cell subordinate to the radio base station to the cell subordinate to the neighboring radio base station on the basis of the registered-group identification information and the access mode, managed by the management unit, of the cell subordinate to the neighboring radio base station.

A fourth characteristic of the present embodiment is summarized in that a radio base station, comprising, an acquisition unit configured to acquire registered-group identification information and an access mode of the cell subordinate to a neighboring radio base station contained in a configuration change signal transmitted by the neighboring radio base station, a management unit configured to manage the registered-group identification information and the access mode, acquired by the acquisition unit, of the cell subordinate to the neighboring radio base station, and a handover processing unit configured to decide a method for performing a handover of a mobile station from the cell subordinate to the radio base station to the cell subordinate to the neighboring radio base station on the basis of the registered-group identification information and the access mode, managed by the management unit, of the cell subordinate to the neighboring radio base station.

BRIEF DESCRIPTION OF THE DRAWINGS

FIG. 6 is the diagram illustrating an example of an information element included in an "X2 setup request" message used in the mobile communication system according to the first embodiment of the present invention.

FIG. 7 is the diagram illustrating an example of an information element in an information element "Served Cell Information" included in the "X2 setup request" message used in the mobile communication system according to the first embodiment of the present invention.

FIG. 8 is the diagram illustrating an example of an information element included in the "X2 setup response" message used in the mobile communication system according to the first embodiment of the present invention.

FIG. 11 is the diagram illustrating an example of an information element included in an "eNB Configuration Update" message used in the mobile communication system according to the first embodiment of the present invention.

BEST MODES FOR CARRYING OUT THE INVENTION

Configuration of Mobile Communication System According to First Embodiment of the Present Invention With reference to FIG. 1 and FIG. 2, the configuration of the mobile communication system according to the first embodiment of the present invention will be described.

Figure 1:
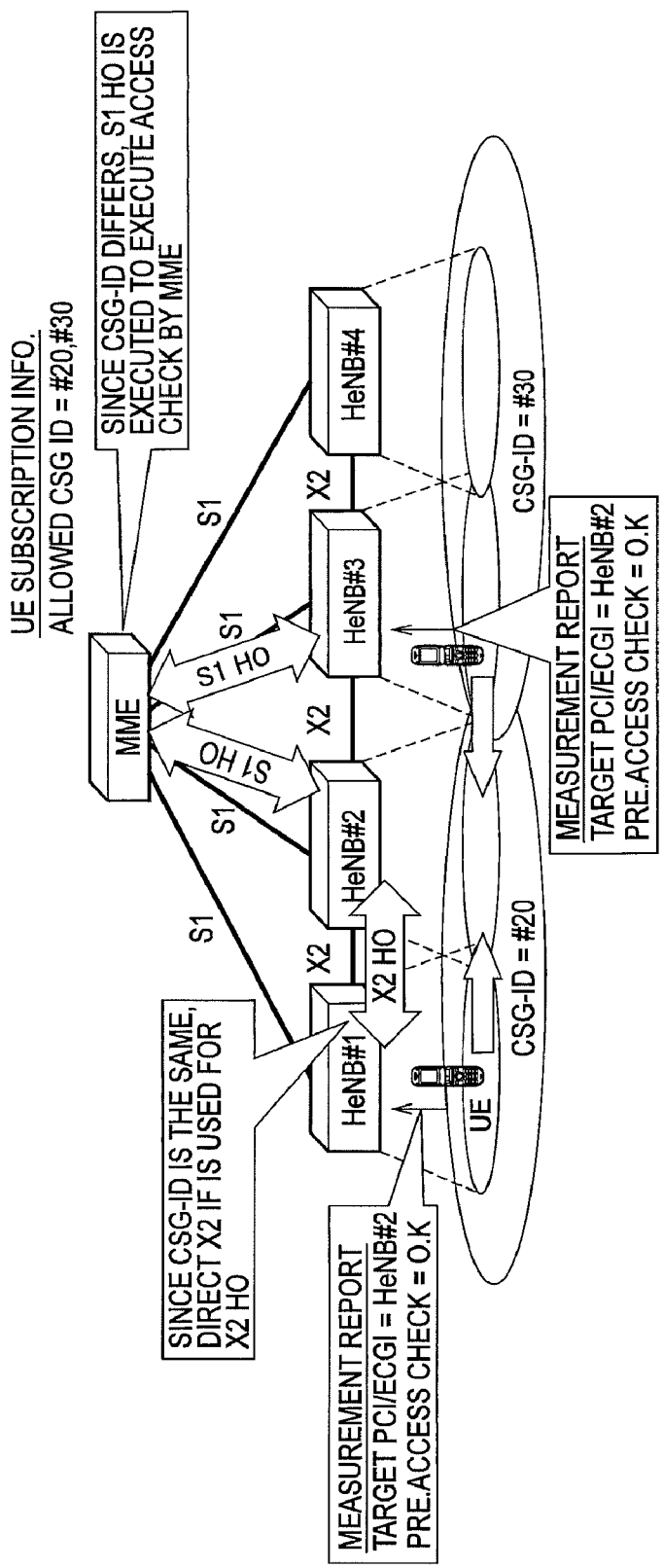
FIG. 1 is a diagram illustrating the entire configuration of a mobile communication system according to a first embodiment of the present invention.

The mobile communication system according to the present embodiment is a mobile communication system of an LTE scheme, and as illustrated in FIG. 1, the system is equipped with a mobile switching center MME (Mobility Management Entity) and a plurality of radio base stations HeNB#1 to #4.

Here, each radio base station HeNB can establish an X2 connection to one another through an X2 interface, and between each of the radio base stations HeNB#1 to #4 and a mobile switching center MME, an S1 connection can be established through an S1 interface.

The mobile switching center MME manages "UE subscription info" as illustrated in FIG. 1. The "UE subscription info" contains "Allowed CSG-ID" illustrating a list of identification information (i.e. CSG-ID) of a group of registered mobile stations in each of the radio base stations HeNB#1 to #4.

The mobile switching center MME is configured to perform "Access check" for a handover destination cell of the mobile station UE with reference to the "Allowed CSG-ID" when the mobile station UE performs an S1 handover.

Furthermore, as illustrated in FIG. 1, the mobile station UE is configured to transmit, when the report conditions instructed by the radio base station HeNB has been satisfied, "Measurement Report" containing, for example, "Target PCI/ECGI" designating the neighboring cell in which the measurement conditions instructed by the radio base station HeNB are satisfied and "Preliminary Access check" indicating the result of "Access check" for the neighboring cells, to the radio base station HeNB which manages a serving cell of the mobile station UE (for example, radio base station HeNB#1 or HeNB#3).

Figure 2:
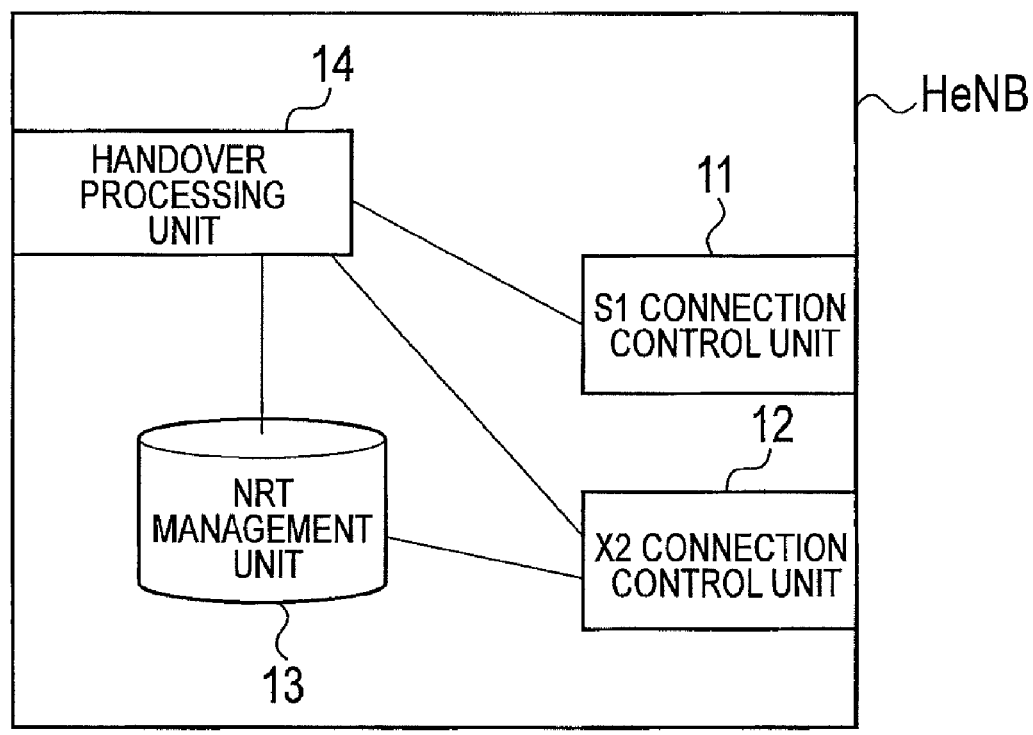
FIG. 2 is a functional block diagram of a radio base station according to the first embodiment of the present invention.

As illustrated in FIG. 2, each of the radio base stations HeNB#1 to #4 (hereinafter, collectively illustrated as a radio base station HeNB) is equipped with an S1 connection control unit 11, an X2 connection control unit 12, an NRT (Neighbor Relation Table) management unit 13, and a handover processing unit 14.

The S1 connection control unit 11 is configured to perform control related to the S1 connection with the mobile switching center MME. For example, the S1 connection control unit 11 is configured to perform processes of establishing, changing, and releasing the S1 connection with the mobile switching center MME.

The X2 connection control unit 12 is configured to perform control related to the X2 connection with a neighboring radio base station. For example, the X2 connection control unit 12 is configured to perform processes of establishing, changing, and releasing the X2 connection with the neighboring radio base station.

Here, the X2 connection control unit 12 may also be configured to acquire, at the time of establishing the X2 connections with the neighboring radio base station, CSG-ID and Access Mode of the cell subordinate to the neighboring radio base station, from the neighboring radio base station.

Furthermore, the X2 connection control unit 12 may also be configured to acquire the CSG-ID and the Access Mode, which are included in "eNB Configuration Update" transmitted by the neighboring radio base station, of the cell subordinate to the neighboring radio base station.

Here, three types, i.e., "Open", "Hybrid" or "Closed" can be set as the "Access Mode".

The "Open" provides an indiscriminate access grant to all the mobile stations UE, the "Closed" provides an access grant only to the registered mobile station, and the "Hybrid" provides an access grant by differentiating a service quality (QoS: Quality of Service) between the registered mobile station and an unregistered mobile station.

The NRT management unit 13 is configured to manage, in the NRT, the CSG-ID and the Access Mode, acquired by the X2 connection control unit 12, of the cell subordinate to the neighboring radio base station.

Figure 3:
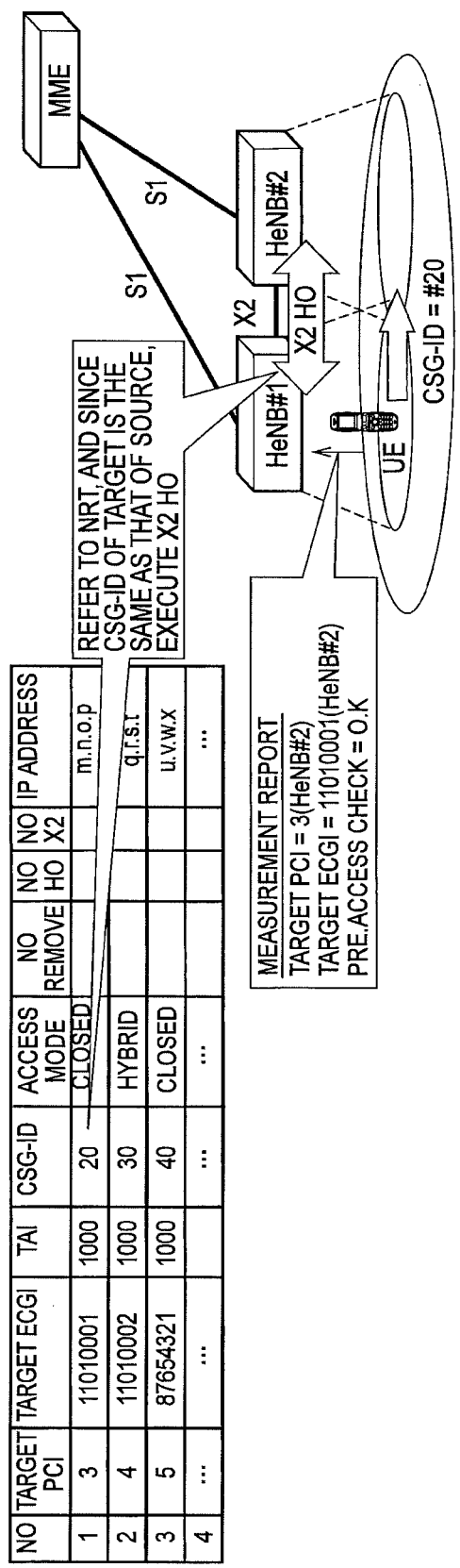
FIG. 3 is the diagram to explain a state where the radio base station according to the first embodiment of the present invention generates NRT.

For example, as illustrated in FIG. 3, the NRT management unit 13 may also be configured to register the CSG-ID and the Access Mode, acquired by the X2 connection control unit 12, of the cell subordinate to the neighboring radio base station, without modification, into the NRT.

Figure 4:
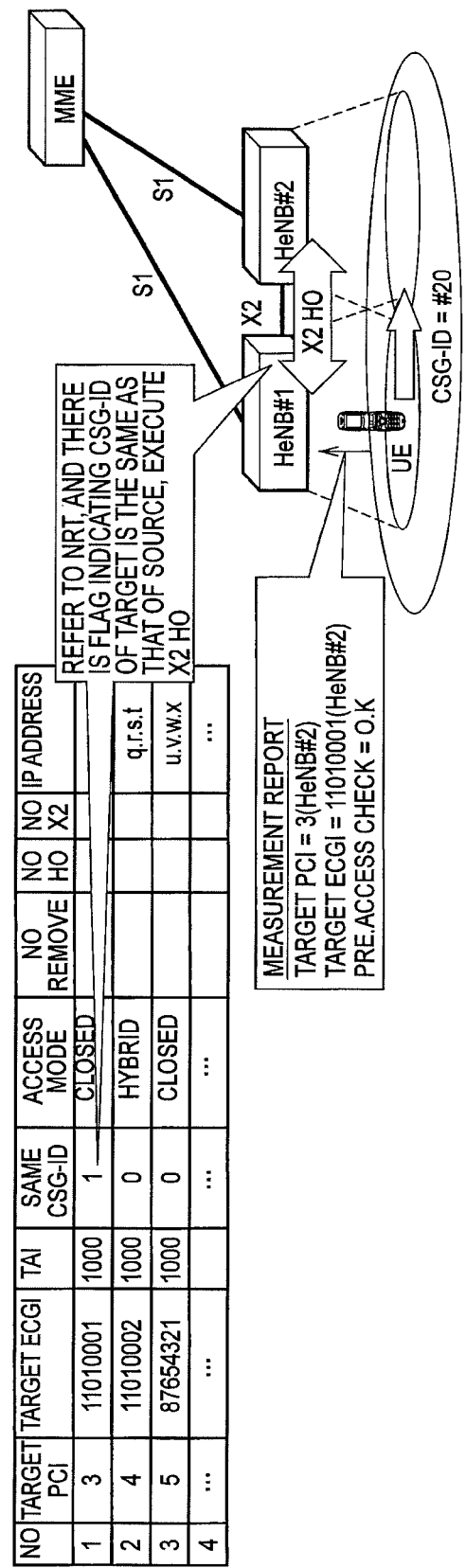
FIG. 4 is the diagram to explain a state where the radio base station according to the first embodiment of the present invention generates the NRT.

Alternately, as illustrated in FIG. 4, the NRT management unit 13 may also be configured to register the Access Mode, acquired by the X2 connection control unit 12, of the cell subordinate to the neighboring radio base station, without modification, into the NRT, and to set the information indicating whether the CSG-ID of the cell subordinate to the neighboring radio base station are the same as the CSG-ID of the cell subordinate to the radio base station HeNB, for example, a 1-bit "Same CSG-ID" flag.

Here, the NRT management unit 13 may be configured to set "1" to the "Same CSG-ID" flag when the CSG-ID of the cell subordinate to the neighboring radio base station is the same as the CSG-ID of the cell subordinate to the radio base station HeNB and to set "0" to the "Same CSG-ID" flag when the CSG-ID of the cell subordinate to the neighboring radio base station is different from the CSG-ID of the cell subordinate to the radio base station HeNB.

The handover processing unit 14 is configured to determine whether to perform a handover of the mobile station UE from the cell subordinate to the radio base station HeNB to the neighboring radio base station on the basis of the "Measurement Report" transmitted from the mobile station UE and then to perform the process related to the handover.

Here, the handover processing unit 14 is configured to decide the method for performing a handover of the mobile station UE from the cell subordinate to the radio base station HeNB to the cell subordinate to the neighboring radio base station on the basis of the CSG-ID and the Access Mode, managed by the NRT management unit 13, of the cell subordinate to the neighboring radio base station.

For example, the handover processing unit 14 may be configured such that the "X2 handover" is considered as a method for performing the above-described handover when the CSG-ID of the cell subordinate to the neighboring radio base station and the CSG-ID of the cell subordinate to the radio base station HeNB is the same and the Access Mode of the cell subordinate to the neighboring radio base station is not the "Open" (in other words, when it is the "Closed" or the "Hybrid").

Furthermore, the handover processing unit 14 may be configured such that the "S1 handover" is considered as the method for performing the above-described handover as when the CSG-ID of the cell subordinate to the neighboring radio base station and the CSG-ID of the cell subordinate to the radio base station HeNB are different and the Access Mode of the cell subordinate to the neighboring radio base station is not the "Open" (In other words, when it is the "Closed" or the "Hybrid").

Moreover, the handover processing unit 14 may be configured such that "Handover not possible" is considered as the method for performing the above-described handover when the CSG-ID of the mobile station UE is not included in the CSG-ID of the cell subordinate to the neighboring radio base station and the Access Mode of the cell subordinate to the neighboring radio base station is the "Closed".

In addition, the handover processing unit 14 may be configured such that the "X2 handover for unregistered mobile stations" is considered as the method for performing the above handover when the CSG-ID of the mobile station UE is not included in the CSG-ID of the cell subordinate to the neighboring radio base station and the Access Mode of the cell subordinate to the neighboring radio base station is the "Hybrid".

Besides, the handover processing unit 14 may be configured such that the "X2 handover" is considered as the method for performing the above handover when the Access Mode of the cell subordinate to the neighboring radio base station is the "Open".

Operation of the Mobile Communication System According to the First Embodiment of the Present Invention The operation of the mobile communication system according to the first embodiment of the present invention is explained with reference to FIG. 5 to FIG. 11.

At first, the operation when the radio base station HeNB#1 is activated in the mobile communication system according to the first embodiment of the present invention is explained with reference to FIG. 5.

Figure 5:
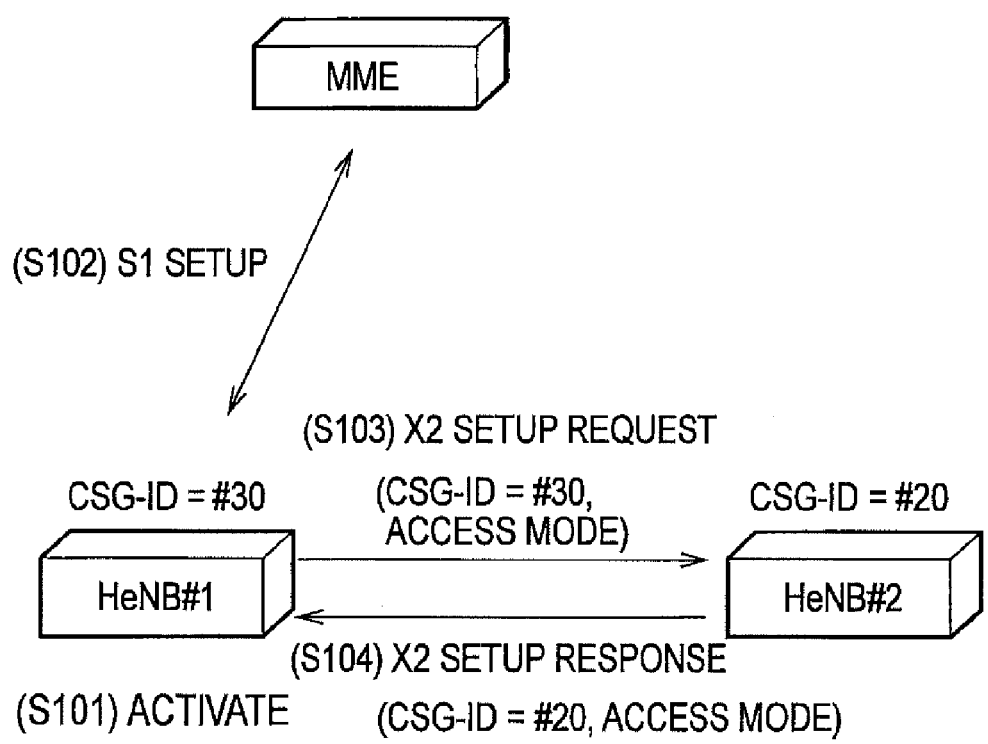
FIG. 5 is the diagram to explain an operation of the mobile communication system according to the first embodiment of the present invention.

As illustrated in FIG. 5, if the radio base station HeNB#1 is activated in step S101, the S1 connection is established with the mobile switching centers MME in step S102.

In step S103, the radio base station HeNB#1 transmits "X2 setup request message" containing the CSG-ID (=#30) and the Access Mode of the cell subordinate to the radio base station HeNB#1, to the radio base station HeNB#2 which is the neighboring radio base station.

For example, the radio base station HeNB#1 may also notify the CSG-ID (=#30) of the cell subordinate to the radio base station HeNB#1 by information element "CSG ID (refer to FIG. 7)" present in the information element "Served Cell Information (refer to FIG. 6)" which is present in the "X2 setup request message".

Furthermore, the radio base station HeNB#1 may also notify the Access Mode of the cell subordinate to the radio base station HeNB#1 by information element "Cell Access Mode (refer to FIG. 7)" present in the information element "Served Cell Information (refer to FIG. 6)" which is present in the "X2 setup request message".

In step S104, the radio base station HeNB#2 transmits "X2 setup response message" containing the CSG-ID (=#20) and the Access Mode of the cell subordinate to the radio base station HeNB#2, to the radio base station HeNB#1.

For example, the radio base station HeNB#2 may also notify the CSG-ID (=#20) of the cell subordinate to the radio base station HeNB#2 by the information element "CSG ID (refer to FIG. 7)" present in the information element "Served Cell Information (refer to FIG. 8)" which is present in the "X2 setup response message".

Furthermore, the radio base station HeNB#2 may also notify the Access Mode of the cell subordinate to the radio base station HeNB#2 by the information element "Cell Access Mode (refer to FIG. 7)" present in the information element "Served Cell Information (refer to FIG. 8)" which is present in the "X2 setup response message".

Secondly, another operation when the radio base station HeNB#1 is activated in the mobile communication system according to the first embodiment of the present invention is explained with reference to FIG. 9.

Figure 9:
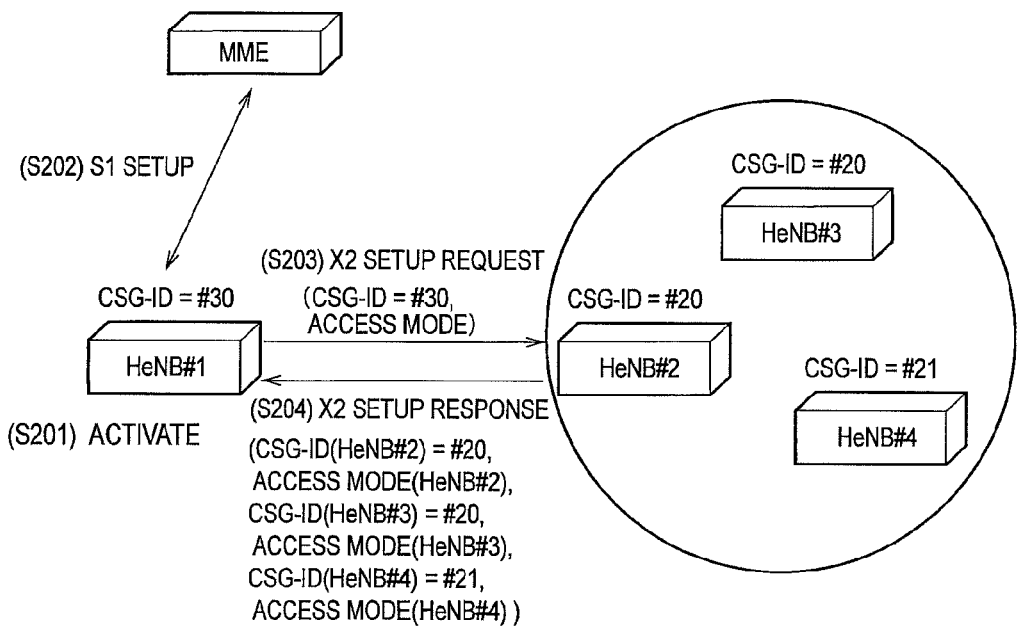
FIG. 9 is the diagram to explain the operation of the mobile communication system according to the first embodiment of the present invention.

As illustrated in FIG. 9, if the radio base station HeNB#1 is activated in step S201, the S1 connection is established with the mobile switching centers MME in step S202.

In step 203, the radio base station HeNB#1 transmits the "X2 setup request message" containing the CSG-ID (=#30) and the Access Mode of the cell subordinate to the radio base station HeNB#1, to the radio base station HeNB#2 which is the neighboring radio base station.

Here, the radio base station HeNB#1 may also notify the CSG-ID of the cell subordinate to the neighboring radio base station by the information element "CSG ID (refer to FIG. 6)" included in information element "Neighbour Information (refer to FIG. 6)" which is present in the "X2 setup request message".

Furthermore, the radio base station HeNB#1 may also notify the Access Mode of the cell subordinate to the neighboring radio base station by the information element "Cell Access Mode (refer to FIG. 6)" included in the information element "Neighbour Information (refer to FIG. 6)" which is present in the "X2 setup request message".

In step S204, in addition to the CSG-ID (=#20) and the Access Mode of the cell subordinate to the radio base station HeNB#2, the radio base station HeNB#2 transmits, to the radio base station HeNB#1, the "X2 setup response message" containing CSG-ID (=#20) and Access Mode of cell subordinate to the radio base station HeNB#3 and CSG-ID (=#21) and Access Mode of cell subordinate to the radio base station HeNB#4 which is the neighboring radio base station.

For example, the radio base station HeNB#2 may also notify the CSG-IDs of the cells subordinate to the radio base stations HeNB#2 to #4 by the information element "CSG ID (refer to FIG. 8)" included in the information element "Neighbour Information (refer to FIG. 8)" which is present in the "X2 setup response message".

For example, the radio base station HeNB#2 may also notify the Access Modes of the cells subordinate to the radio base stations HeNB#2 to #4 by the information element "Cell Access Mode (refer to FIG. 8)" included in the information element "Neighbour Information (refer to FIG. 8)" which is present in the "X2 setup response message".

Thirdly, the operation when at least one of the CSG-ID and the Access Mode of the radio base station HeNB#2 changes in the mobile communication system according to the first embodiment of the present invention is explained with reference to FIG. 10.

Figure 10:
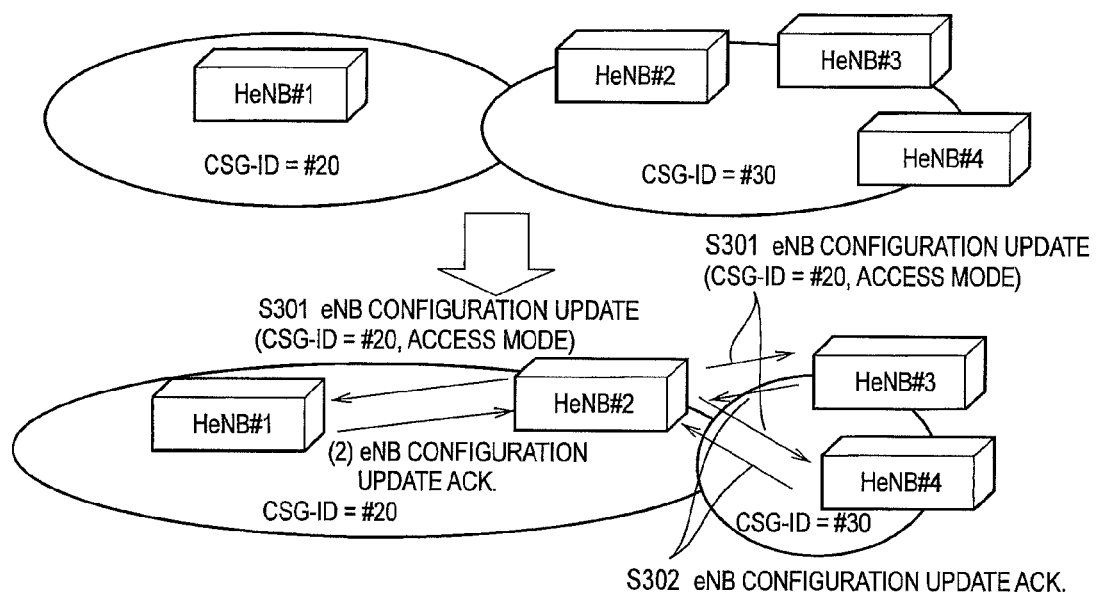
FIG. 10 is the diagram to explain the operation of the mobile communication system according to the first embodiment of the present invention.
Figure 12:
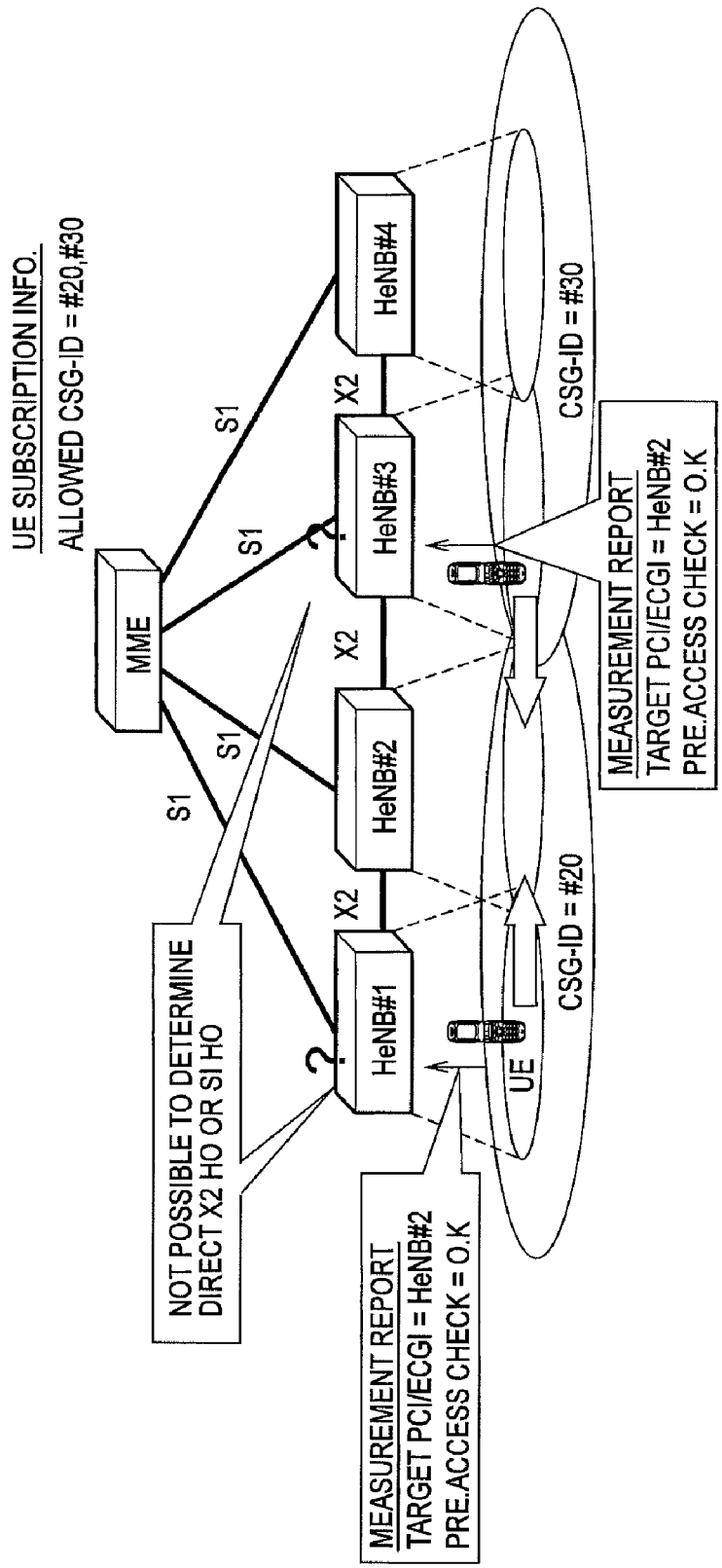
FIG. 12 is a diagram illustrating the entire configuration of a conventional mobile communication system.

As illustrated in FIG. 10, if at least one of the CSG-ID and the Access Mode of the radio base station HeNB#2 is changed, in step S301, the radio base station HeNB#2 transmits "eNB Configuration Update message" containing at least one of the changed CSG-ID (=#20) and Access Mode of the cell subordinate to the radio base station HeNB#2, to the radio base stations HeNB#1, #3 and #4 which are the neighboring radio base stations.

Here, when a new cell is added subordinate to the radio base station HeNB#2, the radio base station HeNB#2 may also notify CSG-ID of the newly added cell by the information element "CSG ID (refer to FIG. 11)" present in information element "Served Cells To Add (refer to FIG. 11)" which is present in the "eNB Configuration Update message".

Furthermore, when a new cell is added subordinate to the radio base station HeNB#2, the radio base station HeNB#2 may also notify the Access Mode of the newly added cell by the information element "Cell Access Mode (refer to FIG. 11)" present in the information element "Served Cells To Add (refer to FIG. 11)" which is present in the "eNB Configuration Update message".

Alternately, when the CSG-ID of the cell subordinate to the radio base station HeNB#2 is changed, the radio base station HeNB#2 may also notify the changed CSG-ID of the cell subordinate to the radio base station HeNB#2 by the information element "CSG ID (refer to FIG. 11)" present in information element "Served Cells To Modify (refer to FIG. 11)" which is present in the "eNB Configuration Update message".

Furthermore, when the Access Mode of the cell subordinate to the radio base station HeNB#2 is changed, the radio base station HeNB#2 may also notify the changed Access Mode of the cell subordinate to the radio base station HeNB#2 by the information element "Cell Access Mode (refer to FIG. 11)" present in the information element "Served Cells To Modify (refer to FIG. 11)" which is present in the "eNB Configuration Update message".

In step S302, the radio base stations HeNB#1, #3, and #4 transmit "eNB Configuration Update Ack message" to the radio base station HeNB#2 after updating at least one of the CSG-ID and the Access Mode of the radio base station HeNB#2 present in the NRT management unit 13.

Operation and Effect of the Mobile Communication System According to the First Embodiment of the Present Invention In the mobile communication system according to the first embodiment of the present invention, all the radio base stations HeNB can acquire the CSG-ID and the Access Mode of the cell subordinate to the neighboring radio base station and manage the same in the NRT. Therefore, the method for achieving the handover can be decided in consideration of the CSG-ID and the Access Mode of the cell subordinate to the neighboring radio base station.

The characteristics of the present embodiment as described above may be expressed as follows.

A first characteristic of the present embodiment is summarized in a mobile communication method comprising: a step of notifying, by a radio base station HeNB#1 (first radio base station), a radio base station HeNB#2 of CSG-ID (registered-group identification information) and Access Mode of cell subordinate to the radio base station HeNB#1, when establishing an X2 connection with a radio base stations HeNB#2 (second radio base station); a step of managing, by the radio base station HeNB#2, the notified CSG-ID and Access Mode of the cell subordinate to the radio base station HeNB#1; and a step of deciding, by the radio base station HeNB#2, a method for performing a handover of a mobile station UE from the cell subordinate to the radio base station HeNB#2 to the cell subordinate to the radio base station HeNB#1 on the basis of the managed CSG-ID and Access Mode of the cell subordinate to the radio base station HeNB#1.

A second characteristic of the present embodiment is summarized as a mobile communication method, comprising: a step of transmitting, by a radio base station HeNB#1, when at least one of CSG-ID and Access Mode of cell subordinate to a radio base station HeNB#1 is changed, "eNB Configuration Update (configuration change signal)" containing at least one of the changed CSG-ID and Access Mode of the cell subordinate to the radio base station HeNB#1, to a radio base station HeNB#2; a step of managing, by the radio base station HeNB#2, the CSG-ID and the Access Mode of the cell subordinate to the radio base station HeNB#1 included in the received "eNB Configuration Update" received; and a step of deciding, by the radio base station HeNB#2, a method for performing a handover of the mobile station UE from the cell subordinate to the radio base station HeNB#2 to the cell subordinate to the radio base station HeNB#1 on the basis of the latest managed CSG-ID and Access Mode of the cell subordinate to the radio base station HeNB#1.

A third characteristic of the present embodiment is summarized as a radio base station HeNB, comprising: an X2 connection control unit 12 (acquisition unit) configured to acquire CSG-ID and Access Mode of cell subordinate to a neighboring radio base station from the neighboring radio base station, when an X2 connection is established with the neighboring radio base station; an NRT management unit 13 configured to manage the CSG-ID and the Access Mode, acquired by an X2 connection control unit 12, of the cell subordinate to the neighboring radio base station; and a handover processing unit 14 configured to decide a method for performing a handover of a mobile station UE from the cell subordinate to the radio base station HeNB to the cell subordinate to the neighboring radio base station on the basis of the CSG-ID and the Access Mode, managed by the NRT management unit 13, of the cell subordinate to the neighboring radio base station.

A fourth characteristic of the present embodiment is summarized as a radio base station HeNB, comprising: an X2 connection control unit 12 configured to acquire CSG-ID and Access Mode of cell subordinate to a neighboring radio base station included in "eNB Configuration Update" transmitted by the neighboring radio base station; an NRT management unit 13 configured to manage registered-group identification information and an access mode, acquired by an X2 connection control unit 12, of the cell subordinate to the neighboring radio base station; and a handover processing unit 14 configured to decide a method for performing a handover of a mobile station UE from the cell subordinate to the radio base station HeNB to the cell subordinate to the neighboring radio base station on the basis of the CSG-ID and the Access Mode, managed by the NRT management unit 13, of the cell subordinate to the neighboring radio base station.

According to the third and fourth characteristics of the present embodiment, the NRT management unit 13 may be configured to manage the information ("Same CSG-ID" flag) indicating whether the CSG-ID of the cell subordinate to the neighboring radio base station is the same as the CSG-ID of the cell subordinate to the radio base station HeNB.

According to the third and fourth characteristics of the present embodiment, the handover processing unit 14 may be configured such that "X2 handover (handover through the X2 interface present between the radio base station HeNB and the neighboring base stations)" is considered as the method for performing the above-described handover when the CSG-ID of the cell subordinate to the neighboring radio base station is the same as the CSG-ID of the cell subordinate to the radio base station HeNB and when the Access Mode of the cell subordinate to the neighboring radio base station is not "Open (access mode that provides an indiscriminate access grant to all the mobile stations UE)" (in other words, when it is "Closed" or "Hybrid").

According to the third and fourth characteristics of the present embodiment, handover processing unit 14 may be configured such that "S1 handover (handover through the S1 interface between the radio base station HeNB and the mobile switching center MME and through the S1 interface between the mobile switching center MME and the neighboring radio base stations)" is considered as the method for achieving the above handover, when the CSG-ID of the cell subordinate to the neighboring radio base station is different from the CSG-ID of the cell subordinate to the radio base station HeNB and when the Access Mode of the cell subordinate to the neighboring radio base station is not the "Open (access mode that provides an indiscriminate access grant to all the mobile stations UE) (in other words, when it is the "Closed" or the "Hybrid").

In addition, the operation of the above-mentioned the radio base station HeNB or mobile station UE may be implemented by hardware, may also be implemented by a software module executed by a processor, or may further be implemented by the combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such a storage medium is connected to the processor so that the processor can write and read information into and from the storage medium. Such a storage medium may also be accumulated in the processor. Such storage medium and processor may be arranged in an ASIC. Such ASIC may be arranged in the radio base station HeNB or mobile station UE. As a discrete component, such storage medium and processor may be arranged in the radio base station HeNB or mobile station UE.

Thus, the present invention has been specifically explained by using the above-mentioned embodiments; however, it is obvious that for persons skilled in the art, the present invention is not limited to the embodiments explained herein. The present invention can be implemented as corrected and modified modes without departing from the gist and the scope of the present invention defined by the claims. Therefore, the description of the specification is intended for explaining the example only and does not impose any limited meaning to the present invention.

INDUSTRIAL APPLICABILITY

As described above, in accordance with the present invention, it is possible to provide a mobile communication method and a radio base station, by which it is possible for a radio base station that manages a handover source cell to decide a method for achieving a handover with consideration of Access Mode and CSG-ID of a handover destination cell.

The invention claimed is:

1. A mobile communication method, comprising a step of deciding, by a second radio base station, a method for performing a handover of a mobile station from a cell subordinate to the second radio base station to a cell subordinate to a first radio base station, wherein
   in the step, the second radio base station considers an X2 handover as the method for performing the handover, when registered-group identification information of the cell subordinate to the first radio base station is the same as registered-group identification information of the cell subordinate to the second radio base station and when an access mode of the cell subordinate to the first radio base station is not "Open".

2. A mobile communication method, comprising a step of deciding, by a second radio base station, a method for performing a handover of a mobile station from a cell subordinate to the second radio base station to a cell subordinate to a first radio base station, wherein
   in the step, the second radio base station considers an S1 handover as the method for performing the handover, when registered-group identification information of the cell subordinate to the first radio base station is different from registered-group identification information of the cell subordinate to the second radio base station and when an access mode of the cell subordinate to the first radio base station is not "Open".

3. A radio base station, comprising a handover processing unit configured to decide a method for achieving a handover of a mobile station from a cell subordinate to a radio base station to a cell subordinate to a neighboring radio base station, wherein
   the handover processing unit is configured to consider an X2 handover as the method for performing the handover, when registered-group identification information of the cell subordinate to the neighboring radio base station is the same as registered-group identification information of the cell subordinate to the radio base station and when an access mode of the cell subordinate to the first radio base station is not "Open".

4. A radio base station, comprising a handover processing unit configured to decide a method for achieving a handover of a mobile station from a cell subordinate to a radio base station to a cell subordinate to a neighboring radio base station, wherein the handover processing unit is configured to consider an S1 handover as the method for performing the handover, when registered-group identification information of the cell subordinate to the neighboring radio base station is different from registered-group identification information of the cell subordinate to the radio base station and when an access mode of the cell subordinate to the first radio base station is not "Open".

* * * * *